United States Patent [19]

Florin et al.

[11] 4,330,411
[45] May 18, 1982

[54] PROCESS FOR TREATING CLARIFIED SLUDGE

[75] Inventors: Gerd Florin, Vorberg; Friedrich Curtius, Lindau; Arthur Dentler, Berg, all of Fed. Rep. of Germany

[73] Assignee: Escher Wyss Limited, Zurich, Switzerland

[21] Appl. No.: 151,671

[22] Filed: May 20, 1980

[30] Foreign Application Priority Data

May 28, 1979 [CH] Switzerland ............... 4941794/79
Oct. 27, 1979 [DE] Fed. Rep. of Germany ....... 2943558

[51] Int. Cl.³ .......................................... C02F 11/12
[52] U.S. Cl. .................................. 210/769; 34/12; 34/14; 34/22; 110/346; 210/771
[58] Field of Search ............... 34/12, 14, 22, 57 A; 110/245, 346; 210/609, 710, 769–771

[56] References Cited

U.S. PATENT DOCUMENTS

| | | | |
|---|---|---|---|
| 2,026,969 | 1/1936 | Flynn | 210/769 |
| 2,062,025 | 11/1936 | Harrington | 34/14 |
| 3,585,732 | 6/1971 | Itahashi | 34/57 A |
| 3,605,274 | 9/1971 | Nara | 34/57 A |
| 3,611,585 | 10/1971 | Nara | 34/57 A |
| 3,649,534 | 3/1972 | Schotte | 210/761 |
| 3,677,404 | 7/1972 | Staffin | 210/769 |
| 3,779,181 | 12/1973 | Staffin et al. | 110/245 |
| 4,038,180 | 7/1977 | Talbert | 210/737 |
| 4,168,670 | 9/1979 | Wall et al. | 110/245 |
| 4,213,407 | 7/1980 | Headley | 110/346 |
| 4,226,712 | 10/1980 | Kamei | 210/710 |
| 4,245,570 | 1/1981 | Williams | 110/346 |

FOREIGN PATENT DOCUMENTS

| | | | |
|---|---|---|---|
| 2251211 | 5/1974 | Fed. Rep. of Germany | 210/770 |
| 389031 | 10/1973 | U.S.S.R. | 210/771 |

*Primary Examiner*—Peter A. Hruskoci
*Attorney, Agent, or Firm*—Robert A. Ostmann

[57] ABSTRACT

The invention relates to the treatment of aqueous materials such as clarified sludge. Disposal of such materials in large quantities is difficult and expensive. The present invention is directed to a treatment method that is economical and results in products which are at least as useful as the starting material. According to the invention, a treatment method comprises mechanical dewatering followed by drying in a fluidized bed drier and burning in a fluidized bed boiler. The heat generated in the boiler is at least sufficient to fulfill the requirements of the drier. The heat generated in the boiler is normally used directly in the drier.

12 Claims, 1 Drawing Figure

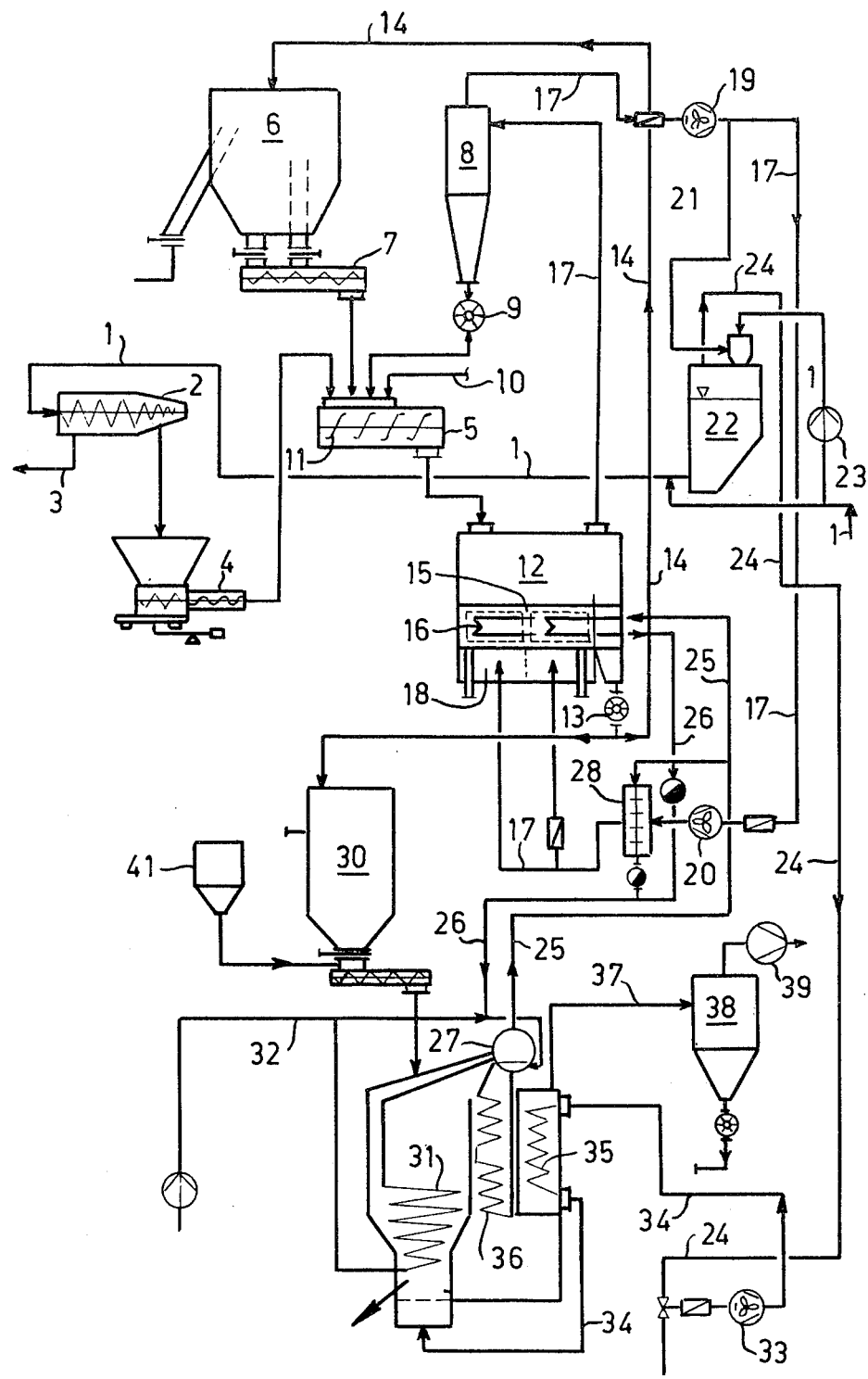

PROCESS FOR TREATING CLARIFIED SLUDGE

BACKGROUND OF THE INVENTION

The invention relates to a method of treating aqueous materials. It is particularly applicable to clarified sludge such as that which is obtained in large amounts in the operation of clarifying plants for treating municipal and industrial effluent, but can also be applied to similar aqueous materials, for example, those having a relatively high ash content, such as organic waste in aqueous suspensions, wet peat, or wet wood shavings or chips.

Sometimes it is possible to apply a clarified sludge directly to agricultural land, as a decomposed thin slurry. However, a number of problems and costs are involved, with regards to the rotting required, the sterilization, packaging and transport. Many clarified sludges are also contaminated with heavy metals, poisons and environmentally unacceptable substances, which means that they cannot be used in this way.

The above use is also impossible in heavily populated areas with large sludge output, since too much demand is made of the transport or of the available agricultural land which is economically accessible. Thus, it has been proposed to thicken or even dry the clarified sludges or other similar materials obtained and to apply them to agricultural land in this form. Also, particularly where such application is not possible owing to the presence of pollutants or for other reasons, it has been proposed to burn the sludges, optionally mixed with a fossil fuel.

These processes have a variety of disadvantages with regard to pollution from the product itself or from the operation of the treatment plant, mostly as a result of pungent-smelling exhaust gases or even exhaust gases which are harmful to health. Their economic viability must also be taken seriously into consideration.

SUMMARY OF THE INVENTION

A primary aim of the present invention is to provide a method which reduces a clarified sludge or other similar material in volume and processes it to yield a product which can satisfactorily be recycled or disposed of. Another aim is to provide such a method which is at least self-sufficient in energy.

According to the invention, a method of treating an aqueous material in a continuous process comprises the sequential steps of: preliminary mechanical dewatering of the material; drying of the dewatered material in a fluidised bed drier; and burning at least some of the dried material in a fluidised bed boiler, wherein at least sufficient heat to cover the requirements of the drying step is produced in the burning step.

It is preferred that the heat generated in the burning step is used directly in the drying step. This, together with other preferred features of the process as are described below enables pollution of the environment to be minimized, both in respect of its operation and its products.

The residue from the drying step in a method of the invention will normally be at least a sterile, dry, and substantially water-insoluble granulate reduced to its ash content, which can be disposed of without causing harm, at the very least, economically in terms of costs and transporting. Depending on the calorific value of the dry content of the material which is to be processed, the method can be at least self-sufficient in energy and therefore economically viable. The residue from the drying step may also be usefully employed.

In preferred embodiments of the invention, the material is granulated between the dewatering and drying steps, the drying step being carried out in a fluidised bed drier with heat exchangers incorporated in the fluidised bed, producing a dry granulate. The bed of the drier is preferably fluidised by gases recirculated from the drying step. This operation of the drier minimizes pollution and permits higher drying temperatures, so that the dried material is also sterile. In this connection, reference is directed to copending Application Ser. No. 151,672, filed May 20, 1980 which describes and claims a thermal treatment for flowable material wherein a bed of material is fluidised by recirculating gases therefrom.

BRIEF DESCRIPTION OF THE DRAWING

The invention will now be described by way of example and with reference to the accompanying drawing which shows, diagrammatically, a plant constructed for performing the process.

DESCRIPTION OF THE PREFERRED EMBODIMENT

A clarified sludge, in this case fresh sludge, to be processed is first delivered through a duct 1 into a centrifugal decanter 2, where mechanical dewatering of the sludge is carried out.

This mechanical dewatering may also be replaced by any other mechanical dewatering system, such as a screen belt or chamber filter press. The centrifugal decanter described here is particularly suitable as it operates completely continuously and in a sealed system. This is of particular importance with the fresh sludge which is to be processed, as it protects the environment from pollution by odors. It should be pointed out here that the process according to the invention is not only applicable to fresh sludge, i.e. clarified sludge in the state in which it is obtained from effluent in the clarifying plant. So-called rotted sludge can also be processed, i.e. clarified sludge which has previously been established in an aerobic or anaerobic rotting process in a sludge-digesting tower or by treatment with $O_2$.

The possibility of processing fresh sludge directly, however, is a major advantage of the process according to the invention, as it does away with the capital investments required for the rotting process.

As will be explained later, the thin clarified sludge/fresh sludge with a dry content of 2–6% DM is advantageously heated to about 60°. This preheating of the sludge makes it possible to increase the usual dewatering capacity of the centrifugal decanter by about 2–5% DM to 15–28% DM, varying according to the composition of the clarified sludge.

To improve the dewatering, conventional flocculation agents are added in metered amounts to the preheated sludge before it passes into the decanter 2.

The water separated off is recycled into the clarifying plant through a duct 3.

The mechanically dewatered sludge is conveyed to a mixing granulator 5 by means of a pump 4. In this mixing granulator 5, the dewatered sludge is processed, in an add-back system, to yield a moist granulate, in a form suitable for subsequent drying and later use, and this is carried out with the addition of add-back material. This add-back material is primarily a portion of the product of the subsequent drying operation, the dried granulate, and the dust from the drying process and, where available, smoke dust from the burning operation, as will be described hereinafter. A particle size of 0.1–8 mm is obtained.

The dewatered thick sludge is delivered to the mixing granulator 5 by the pump 4 in uniform and regulatably metered amounts. The add-back material is delivered as follows: (a) the dry granulate from the dry granulate silo 6 is delivered via a metering screw 7; (b) the dust from the drying is delivered from the sifter 8 via a bucket wheel sluice 9; the smoke ash is delivered via a duct 10.

Advantageously, the mixing granulator 5 is a known high-speed mixer with blade-like mixing members 11. With this, the desired or required granulate can be prepared in one step. The advantage of this mixing granulator is that the dry granulate recycled as add-back material is broken up on the blade-like mixing members and thus the correct particle size is obtained for the particles, to which the thick sludge to be granulated then agglomerates. As is known per se, the correct form desired or required, i.e. the particle size and spectrum of the granulate which is to be prepared and dried, can be adjusted as a function of the ratio of thick sludge to add-back material, the speed of the mixer and the arrangement of the blade-like mixing members.

The processing of the granulate which is to be dried is carried out continuously and the granulate is discharged directly into the fluidised bed contact drier 12, from which it is discharged, dried, in the form of the dry granulate, through a bucket wheel sluice 13. It is transported into the dry granulate silo 6 by means of a corresponding conveying duct 14.

The quantity of granulate which is not needed as add-back material can be removed from the silo 6 continuously or in batches. Drying of the moist granulate is carried out in the fluidised bed contact drier 12, which is known per se, by the technique of cross-current drying in a fluidised bed 15. The drying heat is supplied to the fluidised bed by a heat exchange system with contact surfaces 16. Only the gases produced during drying are used to fluidise the fluidised bed, and are circulated through the bed. These inert gases, steam and vapour are passed through a duct 17 in the circuit from the drier 12 and back into the distribution box 18 of the drier and are passed through the bed again over a flow-in base in order to fluidise the bed. For this, blowers 19 and 20 are incorporated in the circuit. On their way, the gases are freed from dust in the separator 8 and the drying dust collected there is used, as has already been mentioned, as some of the add-back material for preparing the moist granulate.

The excess gases, i.e. the vapours produced during drying which are surplus to the amount required in the circuit described above for fluidising the fluidised bed are drawn off from the system. For this purpose, a branch duct 21 is provided behind the circulating blower 19, through which duct 21 the excess gases are passed into a mixing condenser 22 where they are condensed in direct contact with the clarified sludge which has freshly been fed in for processing. This thin sludge flows through duct 1 via a pump 23, absorbs the heat of condensation and then flows to the decanter 2, as explained hereinbefore.

In contrast to known high temperature systems which operate with hot drying air at 500° to 900° C., in the method according to the invention drying occurs in a low temperature range of from 100° to 300° C. The material is not fluidised by air or exhaust gases, but only by the inert gases circulating, whilst the drying heat is supplied substantially only via the heat exchangers incorporated in the fluidised bed.

In this way, a drying efficiency of nearly 100% can be obtained, whereby the material does not burn and yet it is still possible to use temperatures which ensure sterilisation, i.e. disinfecting, of the product. The material can be heated to 150° and, for brief periods, to 200°, without any danger.

The drying system is thus distinguished by the following advantages:
(a) low heat requirements when operating at full or partial capacity;
(b) good operational reliability even with fluctuating loads;
(c) uniformly well processed product; and
(d) low pollution.

The low pollution characteristics are due to the fact that virtually no exhaust gases are produced. This is also favoured by the existence of a slight underpressure in the drier. This is obtained with the blowers 19 and 20 and the complete condensation of the excess gases in the mixing condenser 22. This underpressure prevents the emission of odors during processing of the moist granulate, since air from the atmosphere flows through the processing equipment into the drier and, together with the drying gases, passes into the mixing condenser 22. Admittedly, this quantity of air cannot be condensed and has to be drawn out of the condenser through a duct, but it can be deodorised and sterilised, as will be described hereinafter, before reaching the atmosphere.

The contact surfaces 16 or heat exchange system in the fluidised bed contact drier 12 are heated with saturated steam. For this purpose, the heating medium is passed through ducts 25 and 26, leading respectively from and to a boiler 27 connected to the drier. The ducts 25 and 26 are also connected to a heat exchanger 28 for regulating the temperature of the gases circulating in the drier 12 in order to fluidise the fludised bed.

The boiler 27 is of conventional construction. According to the invention, in order to heat the fluidised bed in the drier, heat is used which is generated by burning at least some of the dry granulate produced in the drier 12, in the boiler 27. For this purpose the boiler 27 is constructed as a fluidised bed boiler. The dry granulate is removed from the drier at the bucket wheel sluice 13 and is passed through a duct 29 into a silo 30. From here, the dry granualte is delivered, via a regulatable metering screw, into the fluidised bed boiler. Here it is burned in the fluidised bed at temperatures in the region of 900°, for a retention time of about 30 minutes, to form a product, ash in granulate form, i.e. granulated ash, which is substantially insoluble in water. The dry granulate produced in the drier is ideally suited, with respect to its form and residual moisture content, to even burning with the minimum excess of air and maximum through-burning, so as to produce the granulated ash in the fluidised bed. The temperature of the fluidised bed is kept at the required level, possibly by removing heat by means of a heat exchange system 31 incorporated in the fluidised bed. This system 31 is connected to a circulating or supply system 32 for heating medium for the boiler.

The fresh air required for combustion is sucked in by the blower 33 and passed through a duct 34 with air preheating means 35 integrated in the boiler system and thus passed through the fluidised bed.

The abovementioned duct 24 also opens into this fresh air duct 34; the duct removes the non-condensable gases from the mixing condenser 22 which are thus deodorised or made harmless by passing through the fluidised bed of the boiler.

The removal of heat into the circulating system for heating medium in the plant is effected both by means of the abovementioned heat exchangers 31 incorporated in the fluidised bed and also via tube walls fitted with fins, provided in the usual way, and heat exchangers 36 incorporated in the exhaust gas channel.

The exhaust gases are cooled at the abovementioned air preheating means 35, for example, and after passing through a duct and an exhaust gas sifter 38, are released, free from dust, into the atmosphere by means of a blower. The smoke ash caught in the sifter 38 is passed via the bucket wheel sluice 40 and duct 10 to the mixing granulator 5, to be used as part of the add-back material.

If necessary or desired, with respect to the granulated ash produced, sulphur-binding binders, for example, may be fed into the fluidised bed in the boiler, in addition to the granulate which is to be burned. For this purpose, a storage container 41 is provided from which the binders are mixed with the granulate from the silo 30 in the metering screw 31. These binders, for example, bind any pollutant or harmful substances, such as heavy metals, present in the granulate, when the granulate is burned in the fluidised bed. Minerals such as lime or dolomite, for example, may be added.

Besides the abovementioned advantages, the method also has the advantage that known, tried and tested apparatus are used to perform it. A further advantage is its broad range of applications. With this method, almost all municipal and industrial clarified sludges from effluents can be processed economically and in an environmentally satisfactory manner, with the possibility of a choice between different products. Basically, the method offers two alternative products:
(a) dry granulate and granulated ash, and
(b) granulated ash only.

The dry granulate is sterile, dust-free and solid. Its volume is about 7% of the volume of the processed thin sludge. If it does not contain any substances which would make it unusable for this purpose it can economically be applied for improving the soil. Otherwise it can be processed to form building components, for example insulating material and the like. Another possibility is the partial or total burning of the dry granulate, making use of its calorific value as described above. In this way, the process can be partially to totally self-sufficient in energy.

Depending on the calorific value, particularly when all the dry granulate produced is burned, a marketable or usable excess of energy can be obtained, e.g. for generating electrical energy.

It has been found that, when the fluidised bed boiler is used, a calorific value for the dry granulate of 8600 kJ/kg (=2000 kcal/kg) is sufficient to make the process self-sufficient in energy.

The granulated ash produced according to the invention, with a volume of about 4% of the volume of thin sludge processed, constitutes another advantage of the process. It is dust-free, substantially insoluble in water and easily disposed of.

The granular ash granulate produced on burning can be cooled to about 60° C., e.g. by means of the combustion air taken in, advantageously in order to recover heat therefrom, before it leaves the boiler apparatus.

Similarly, the method described with reference to the processing of clarified sludge can be used, with the advantages mentioned above, for processing other organic waste containing combustible dry matter with a correspondingly high ash content. Substances such as peat, leached wood shavings or chips can also be burned to recover their energy or processed, in the same way.

The exhaust gases or excess gases from the drying stage may also be condensed by indirect heat exchange, e.g. with watr as the cooling medium.

| Technical data of an embodiment by way of example: | |
|---|---|
| Size of plant for approximately 1 million inhabitant equivalents (IE), operating for 8000 hours per annum. | |
| Working area of fluidised bed drier | 3 m$^2$ |
| Working area of fluidised bed boiler | 1.8 m$^2$ |
| Absolute dry throughput (incl. combustible portion) | 630 kg/h |
| DM (dry matter) concentration before mech. dewatering | 2% by weight DM |
| DM concentration after mech. dewatering | 20% by weight DM |
| DM concentration after thermal drying | 98% by weight DM |
| Flow rates of masses | |
| Thin sludge before mech. dewatering | 31.5 t/h |
| Thick sludge after mech. dewatering | 3.15 t/h |
| Dust from drying | 0.78 t/h |
| Dust from combustion | 0.02 t/h |
| Dry granulate after fluidised bed drier | 16.039 t/h |
| Excess granulate for combustion | 0.640 t/h |
| Combustible portion in dry granulate | 64% by weight |
| Quantity of granulated ash | 0.225 t/h |
| Flow volume of granulated ash | 0.4 m$^3$/h |
| Fresh air requirement for burning | 2800 mm$^3$/h |
| Exit temperature of exhaust gas | 150° C. |
| Electrical energy requirement | 180 kW |

We claim:
1. A method of treating an aqueous sludge containing combustible solid matter in a continuous process comprising the steps of
   a. mechanically dewatering the sludge;
   b. granulating the dewatered sludge;
   c. drying the dewatered, granulated sludge in a drier containing a fluidized bed consisting of the granulate to be dried at a temperature of 100°–300° C., but always less than the incineration point of the solid matter, the drying step involving the production of exhaust gases containing essentially inert steam;
   d. withdrawing the exhaust gases from the drier and dividing same into two parts;
   e. freeing one of the exhaust gas parts of dust and then recirculating it to the bed of the drier to serve as the sole fluidizing medium for that bed;
   f. condensing the steam in the remaining part of the exhaust gases;
   g. withdrawing dried granulate from the drier and adding a part thereof to the dewatered sludge in the granulating step;
   h. withdrawing dried granulate from the drier and burning same to an ash granulate in a fluidized bed boiler at a temperature of 800°–900° C., the bed of the boiler consisting essentially of the introduced dried granulate and the ash resulting from burning;

i. heating the bed of the drier by heat exchangers incorporated in that bed which transfer to the bed only heat generated in the boiler; and j. removing the granulated ash resulting from the burning of the dried granulate in the boiler.

2. A method as defined in claim 1 including the step of introducing the dust freed from the exhaust gas to the dewatered sludge in said granulating step.

3. A method as defined in claim 1 wherein the burning step results in second exhaust gases containing dust, and which includes the steps of separating the dust from the second exhaust gases; and introducing the separated dust to the dewatered sludge in said granulating step.

4. A method as defined in claim 1 including the step of utilizing the heat resulting from said condensing step to heat the sludge before the dewatering step.

5. A method as defined in claim 4 in which said condensing and heating of the sludge is effected by direct contact between the exhaust gases and the sludge.

6. A method as defined in claim 5 wherein the exhaust gases contain a fraction which does not condense in said condensing step; and which includes the step of utilizing said fraction in a fluidizing medium for the bed of the boiler.

7. A method as defined in claim 4 in which said heating is effected by indirect heat exchange, and the addition of the condensate thus produced to the sludge.

8. A method as defined in claim 7 wherein the exhaust gases contain a fraction which does not condense in said condensing step; and which includes the step of utilizing said fraction in a fluidizing medium for the bed of the boiler.

9. A method as defined in claim 1 including the step of maintaining said temperature of the boiler by transferring heat from the fluidized bed to water in piping of a steam generator.

10. A method as defined in claim 1 including the step of feeding to the fluidized bed of the boiler binders for pollutants in the dry granulate.

11. A method as defined in claim 1 including the step of maintaining the drier at a subatmospheric pressure.

12. A method as defined in claim 1 wherein the amount of heat generated in the burning step exceeds the heating needs of the drying step, whereby the boiler constitutes a source of available energy for other purposes.

* * * * *